Oct. 8, 1963

B. A. GREGORY 3,106,250

PEANUT DIGGING MACHINE

Filed March 5, 1962

3 Sheets-Sheet 2

INVENTOR

Buck A. Gregory

BY George M. Anderson,

ATTORNEY

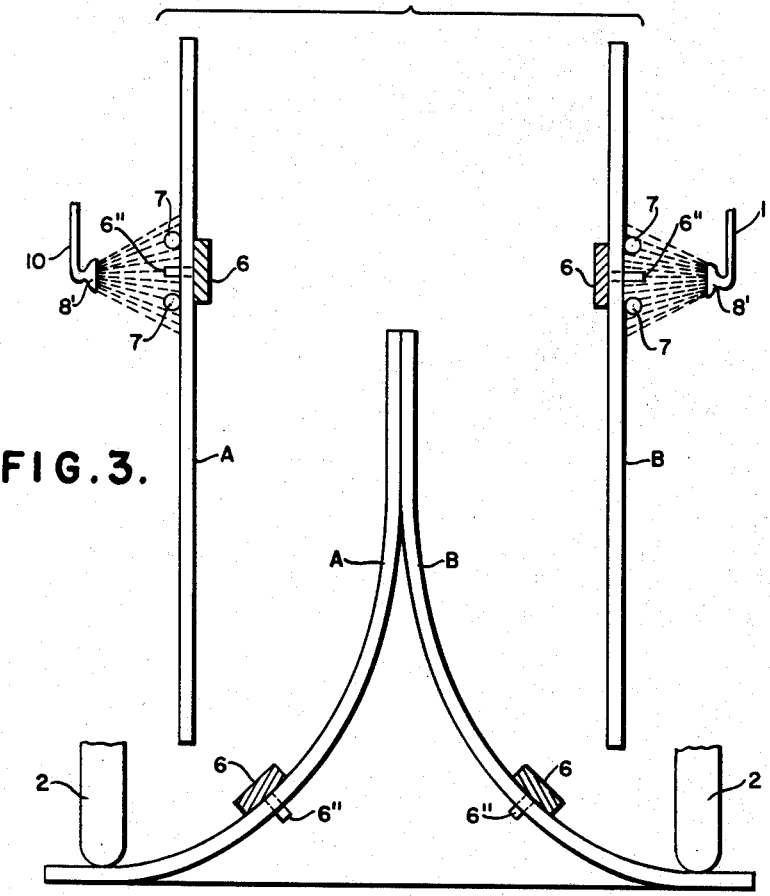
FIG. 3.
FIG. 4.
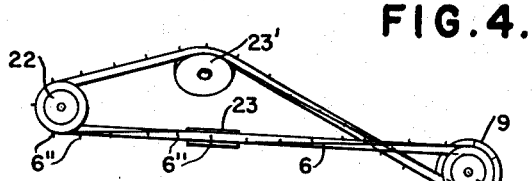
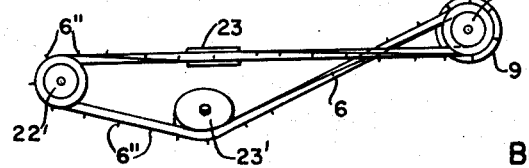
FIG. 5.

United States Patent Office 3,106,250
Patented Oct. 8, 1963

3,106,250
PEANUT DIGGING MACHINE
Buck A. Gregory, late of Portales, N. Mex.; Lucille Gregory, administratrix of said Buck A. Gregory, deceased
Filed Mar. 5, 1962, Ser. No. 177,414
6 Claims. (Cl. 171—61)

The invention relates to machines for digging peanuts, this application being related to the application Serial No. 18,900, filed March 31, 1960, allowed June 19, 1961, now Patent No. 3,024,849. The machines of both applications are the first for simultaneously digging two rows of peanut vines and stacking the two rows in one continuous row upon the ground to dry.

In the disclosure of the first filed pending application, the endless belt assembly includes four pairs of endless belts whereas in the disclosure of this application the endless belt assembly includes only one pair of endless belts with consequent simplification in other respects. This makes evident the object of this invention. Other objects and advantages will appear hereinafter or will be obvious.

The invention consists in the novel construction and combinations of parts, hereinafter set forth in the claims.

Figure 1:
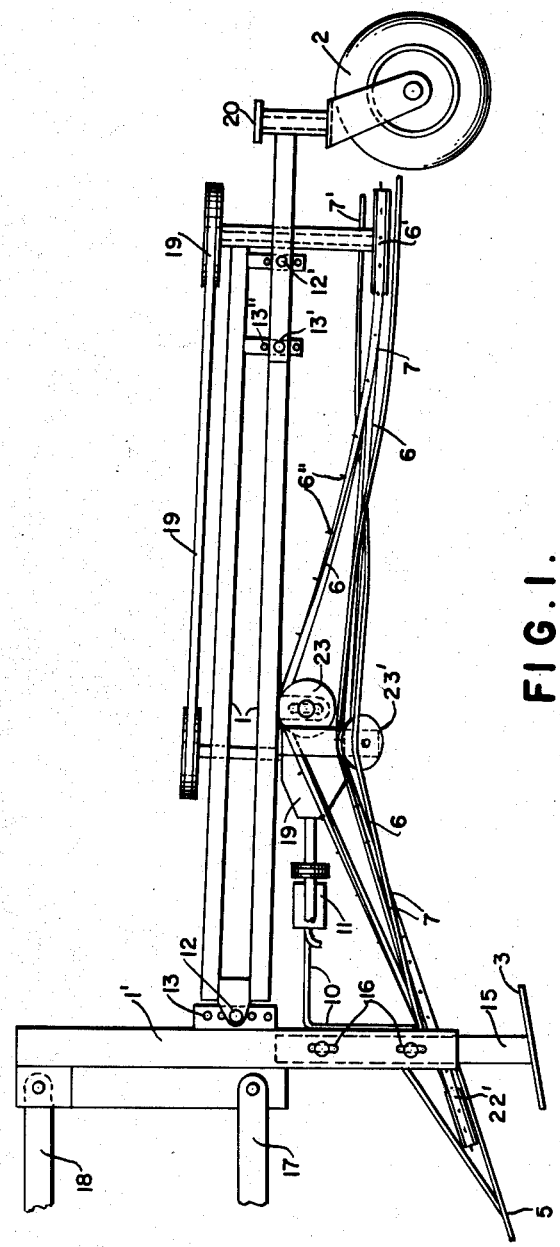
Figure 2:
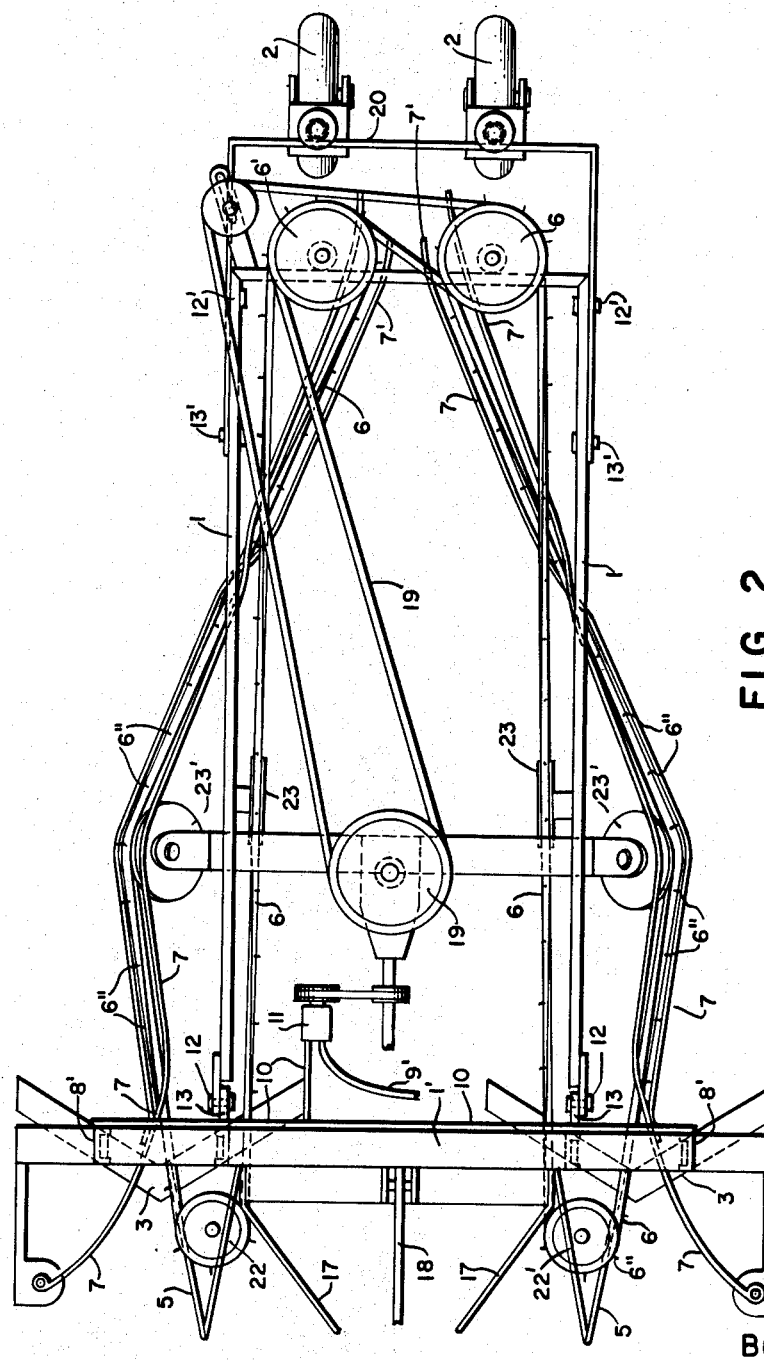

In the accompanying drawings:
FIGURE 1 is a side view of the machine.
FIGURE 2 is a plan view of the same.
FIGURE 3 is a diagrammatic cross-sectional view, not drawn to scale, taken through the forward part of the machine showing the vine rows A and B engaged with the two endless belts.
FIGURE 4 is a view similar to FIG. 3, showing the vine rows A and B leaning against and mutually supporting each other, in a single row, with the vine tops on the ground in front of and adjacent the wheels 2.
FIGURE 5 is a detail plan view of the two endless belts.

Referring to the drawings, the numeral 1 designates the machine frame having two rear transversely spaced supporting wheels 2, the machine being adapted to be drawn by a tractor as will be described, the tractor not being shown.

Said frame is provided at its lower forward end with plow blades 3 having sharpened forward edges and which normally rest on the ground, for lifting and loosening the roots of the vines of the two rows A and B in the soil, said plow blades being slightly inclined.

Said frame is provided with an endless belt assembly comprising a single pair of endless belts 6, the forward part of said belt assembly being inclined upwardly and rearwardly for entirely lifting the roots of the vines of the two rows from the soil.

Vine lifters 5 located forwardly of and vertically spaced from said plow blades function to lift the vines from the ground to erect position, while their roots are still in the soil, so that the vines of the two rows so lifted will be caught by said belts as the machine is moved forwardly, said belts having laterally projecting teeth 6" for penetrating the vines and dragging them through the machine.

The rear part of said endless belt assembly is inclined downwardly and rearwardly in converging relationship, the forward runs thereof being twisted to bring the roots of the vines of the two rows together and uppermost and the tops of the vines of the two rows downmost and spaced apart so that the vines of the two rows will be discharged in one continuous row on the ground with their tops in front of and adjacent said wheels, said wheels functioning to press the tops of the vines on the ground as the machine is moved forwardly.

Fixed rods 7 are associated with the forward runs of said belts, functioning to press the vines against the belts with said teeth engaged with the vines against escape therefrom until their said discharge, said rods being twisted similarly to that of said belts. The rear pulleys 6' of said belts have lateral flanges 9, functioning to release the vines of the two rows from said teeth, said rods having their rear ends 7' bent outwardly away from said belts to facilitate said release and said discharge.

The twist of the forward moving runs of the belts to bring their roots bearing the nuts uppermost and together and their tops downmost and spaced apart may be three-eighths of a complete twist or three-fourths of a complete twist, depending upon the direction of the twist being clockwise or counterclockwise. The endless belts may be either of leather or its equivalent or chain belts.

The machine has a water supply tank (not shown) from which water is pumped through hose or pipe 9', by pump 11 driven from the main drive shaft, through pipe 10 to nozzle 8', one for each row, thereby spraying the vines of each row on the side that slides on the fixed rods 7. This is done because juice or sap from the vines mixed with dirt tends to adhere to said rods 7 and causes them to become so rough that the vines are impeded from sliding freely thereon. The spraying of the vines with a small amount of water as stated overcomes this difficulty.

The machine frame comprises a horizontally directed main frame 1, and a forwardly disposed vertically directed plow blade frame 1', carrying said plow blades and having intermediately of its height horizontal hinge bolt connections 12 with said main frame, said main frame being liftable pivotally upon said wheels 2 as centers, said plow blade frame being simultaneously pivotally movable upon said bolt connections with respect to said main frame, and liftable therewith to raise said plow blades from the ground. The hinge bolt connections 12 are vertically adjustable in holes 13 for more or less clearance between the plow blades 3 and vine lifters 5.

The machine is adapted to be drawn by a tractor, not shown, connected with the machine frame by pull arms 17 and 18. The machine is driven by tractor power take-off shaft, through main drive 19, which drives pulleys 6' which pulleys drive the belts 6 as shown.

The plow blades 3 are each mounted upon a lower extension 15 of frame 1', said extension having adjustable slot and bolt connection 16 with frame 1'.

The right is reserved to modifications coming within the scope of the claims.

Said wheels 2 are caster wheels, mounter in a transverse frame 20, the lateral arms of which are pivoted at 12', the rear ends of said arms having horizontal bolt connections 13' with said main frame, said bolts being separately engageable with vertical series of holes 13" in depending extensions of the main frame to provide more or less clearance between the pulleys 6' of said belts 6 and the ground.

22 and 22' designate the forward pulleys of said belts 6, and 23 and 23' guide pulleys thereof.

I claim:
1. In a peanut digging machine, means for simultaneously digging two rows of peanut vines and stacking the two rows in one continuous row upon the ground to dry, comprising a machine frame having two rear transversely spaced supporting wheels, plow blades for lifting and loosening the roots of the vines in the soil, vine lifting rods disposed forwardly of and spaced above said plow blades adapted to lift the tops of the vines from the ground to erect position, and means including an endless belt assembly of a single pair of belts having laterally projecting teeth and the forward portion of which is upwardly inclined adapted to penetrate the vines so lifted and carry them upwardly and rearwardly and entirely lift the roots of the vines from the soil.

2. In a peanut digging machine as defined in claim 1, in which said belt pair has its rearward portion inclined downwardly and rearwardly in converging relationship adapted to carry the vines of the two rows together and to discharge them in one continuous row upon the ground.

3. In a peanut digging machine, as defined in claim 2, in which the forward runs of said belt pair are twisted and adapted to twist the vines of the two rows to bring the tops thereof downmost and spread apart and the roots uppermost and together; and in which fixed rods are associated with the forward belt runs to retain the vines engaged with said teeth until their said discharge, said fixed rods being twisted similarly to said belts, and in which said discharge is in front of and adjacent to said wheels, said wheels functioning to press said tops upon the ground as the machine moves forwardly.

4. In a peanut digging machine as defined in claim 3, in which the rear pulleys of said belts have lateral flanges adapted to engage said vines and push them outwardly away from said belts to facilitate said release and said discharge.

5. In a peanut digging machine as defined in claim 1, in which the machine frame comprises a horizontally directed main frame and a forwardly disposed vertically directed plow blade frame carrying said plow blades at its lower end and having intermediately of its height horizontal hinge bolt connections with said main frame, said main frame being liftable pivotally upon said wheels, said plow blade frame being simultaneously pivotally movable upon said bolt connections with respect to said main frame and liftable therewith to raise said plow blades from the ground.

6. In a peanut digging machine as defined in claim 5 in which said wheels are caster wheels mounted in a transverse frame having lateral arms having horizontal hinge bolt connections with said main frame, the rear ends of said arms having vertically adjustable bolt connections with said main frame to provide more or less clearance between said rear pulleys and the ground.

References Cited in the file of this patent
UNITED STATES PATENTS

| | | |
|---|---|---|
| 1,410,420 | Stedman | Mar. 21, 1922 |
| 3,024,849 | Gregory | Mar. 13, 1962 |